United States Patent [19]

Cannelli et al.

[11] Patent Number: 5,072,415
[45] Date of Patent: Dec. 10, 1991

[54] METHOD AND MICROPROCESSOR-BASED APPARATUS FOR DIRECTLY MEASURING A PARTICULAR INDEX FOR THE EVALUATION OF THE ENVIRONMENTAL NOISE POLLUTION

[75] Inventors: Giovanni B. Cannelli; Silvio Santoboni, both of Rome, Italy

[73] Assignee: Consiglio Nazionale Delle Ricerche, Rome, Italy

[21] Appl. No.: 285,443

[22] Filed: Dec. 16, 1988

[30] Foreign Application Priority Data

Dec. 23, 1987 [IT] Italy .................... 48744 A/87

[51] Int. Cl.$^5$ .................... G01H 3/00; G08B 21/00
[52] U.S. Cl. .................... 364/556; 364/505; 381/56; 181/0.5; 73/647
[58] Field of Search .................... 364/556, 508, 505; 73/646, 645, 647; 381/124, 56; 181/0.5

[56] References Cited

U.S. PATENT DOCUMENTS

| | | | |
|---|---|---|---|
| 3,778,552 | 12/1973 | Edinborgh | 73/645 |
| 3,848,471 | 11/1974 | Hamburg et al. | 73/647 |
| 3,892,133 | 7/1975 | Quinn | 73/647 |
| 4,020,286 | 4/1977 | Ceci | 364/556 |
| 4,307,385 | 12/1981 | Evans et al. | 73/647 X |
| 4,554,639 | 11/1985 | Baker et al. | 364/556 |

OTHER PUBLICATIONS

Brüel & Kjaer, Noise, Vibration, Light, Thermal Comfort Pocket Handbook, Sep. 1986, pp. 10, 13, 16.
Brüel & Kjaer, Modular Precision Sound Level Meter, Type 2231, Product Brochure, 8 pages, 7/88.
New Sound-Level Analyzers Utilize Digital Sampling Techniques by Ceci & Stolberg, Sound & Vibration, May 1975, pp. 12, 14.

Primary Examiner—Parshotam S. Lall
Assistant Examiner—S. A. Melnick
Attorney, Agent, or Firm—Young & Thompson

[57] ABSTRACT

This invention relates to a method and a microprocessor-based apparatus for directly measuring the noise using a nuisance index ($L_{DI}$) bound to two physical parameters of the noise: the average energy level ($L_E$) and the fluctuation level of the noise.

The apparatus is comprised of a microphone (M) connected to a pre-amplifier (1) and a detecting unit (2) controlling an analogical-to-digital converter (3) associated to a time (4) feeding a signal to a digital filter (5) and at the same time to one input of a comparator (6). The filter (5) feeds the filtered signal to an integrator (7) supplying the parameter ($L_E$) and simultaneously to the second input of comparator (6) which supplies the parameter ($L_\phi$) through counter (8) associated to a trimmer (10). Parameters ($L_E$) and ($L_\phi$) are indicated in block (9) of the display.

1 Claim, 3 Drawing Sheets

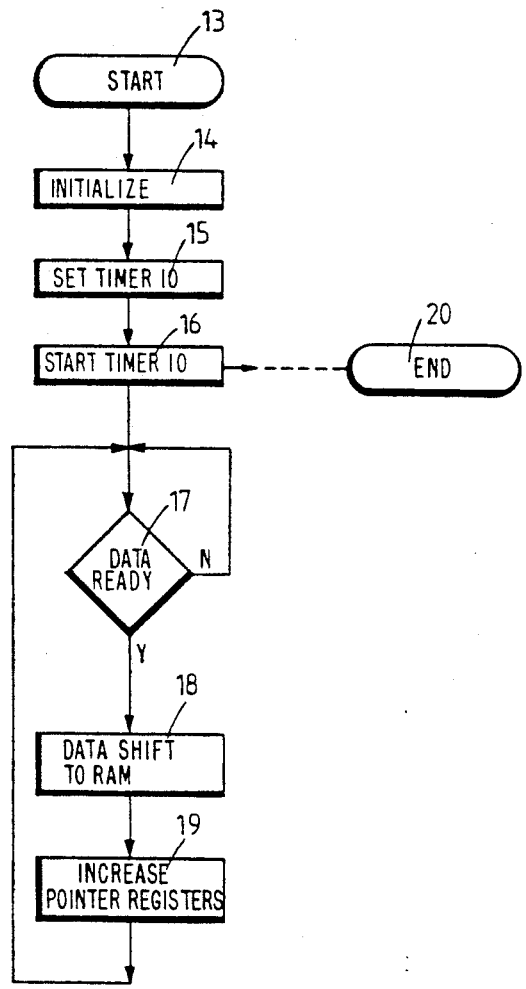
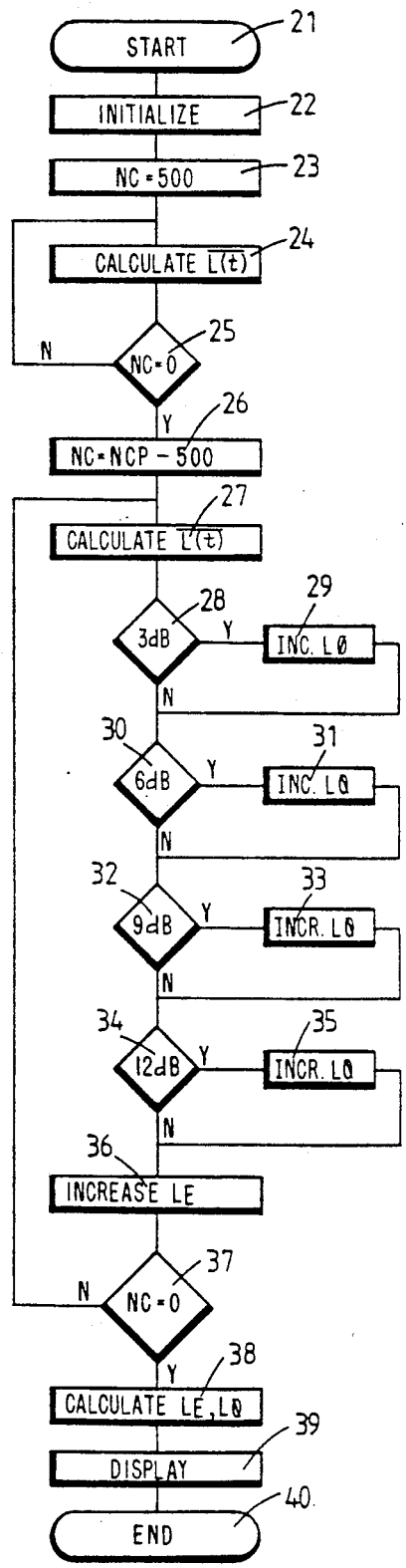

METHOD AND MICROPROCESSOR-BASED APPARATUS FOR DIRECTLY MEASURING A PARTICULAR INDEX FOR THE EVALUATION OF THE ENVIRONMENTAL NOISE POLLUTION

BACKGROUND OF THE INVENTION

This invention relates to a method and a microprocessor-based apparatus for directly measuring the noise using a particular nuisance index associated with two physical parameters of the noise, namely the average energy level of the noise and the noise fluctuation level.

In the prior art methods and devices two different evaluation factors of the environmental noise are considered. The first factor is objective and relates to the physical measurement of the noise, the second factor is subjective and is bound to the difficulty of defining an appropriate nuisance index considering the reactions of people to the noise. While the physical measurement of the noise is currently carried out without excessive difficulty, the subjective aspect of the noise does not lend itself to one definitive solution. In order to provide a real evaluation of the nuisance caused by the noise, the objective parameters such as the noise intensity, the fluctuation, the level of the background noise, the characteristic of the single sound sources, as well as psycho-sociological factors and contingent character which can affect the response of the individual to the noise should be taken into consideration.

The noise parameter processing is effected almost by means of the physical data of the noise, the reliability of which is evaluated by calculating the statistical correlation factor between the objective noise data and the subjective response of people according to suitable evaluation criteria. Presently several indices for the evaluation of the nuisance caused by the environmental noise are provided (Schultz, T. J. Community Noise Rating, Appl. Science, Publ. Essex 1982). However, these evaluations suffer from the shortcoming that the calculation of the indices can be somewhat laborious being founded on a preliminary statistical analysis of noise samples. In addition, while it is current practice to measure the mean level of the noise, a clearly an precisely defined procedure for the noise fluctuation measurement is not yet available.

An index $L_{DI}$ (nuisance level of the noise) proposed by the present inventors some years ago (Cannelli G. B., Santoboni S., "Direct Measurement of Noise Nuisance by the New Index $L_{DI}$, Applied Acoustics, 7, 47 (1974).) is correlated to two essential characteristics of the nuisance caused by the noise: the first one correlates to the sound intensity, the second one to the noise fluctuations. The $L_{DI}$ can be directly measured by means of an analog apparatus built by the same inventors (Cannelli G. B., Santoboni S., Apparatus for directly measuring the nuisance index $L_{DI}$, Technical Report No. 34, IDAC (CNR), 1975). The index $L_{DI}$ as defined in the above publications has not represented the nuisance level of the noise with sufficient accuracy. It has been discovered that the index accuracy can be substantially improved if the negative noise fluctuation is disregarded. It has also been ascertained that the above mentioned analog apparatus does not provide an accurate measurement of the index $L_{DI}$ because of certain non-linearities introduced by the automatic gain control in the amplification of the input signal.

Additionally the analog apparatus does not allow the measurement of index $L_{DI}$ to be effected by a single operation a period of time greater than some tens of seconds due to problems caused by the drift of the analog integrators.

Accordingly, it is desired to provide a method and apparatus which allows measurement of the index $L_{DI}$ over a relatively long period of time.

SUMMARY OF THE INVENTION

The apparatus of this invention is comprised of a microphone feeding a received signal to a pre-amplifier. The amplified signal is input to an RMS-detector provided with a small time constant. The output of the RMS-detector drives an 8-bit analog-to-digital ("A/D") converter associated with a timer. The A/D converter supplies the signal both to a digital filter acting as an RC-circuit having a long time constant and one input of a multiple threshold comparator. The filter outputs a signal both to the other input of the comparator and an integrator which supplies a parameter $L_E$, the average energy level to a display unit. Simultaneously the multiple threshold comparator outputs a signal to suitable store registers associated with a timer providing the parameter $L_\phi$, the noise fluctuation level, which is displayed by the display unit.

The apparatus of this invention includes a microprocessor eliminating the inconvenience of short duration measurements so that uninterrupted measurements from a few seconds to over 30 minutes can be effected assuring a further extension of the time pursuant to the improving of the digital technique. The apparatus is generally based on the following known concept of "nuisance level $L_{DI}$" which has been already introduced by the same inventors in the above publications.

Nuisance level $L_{DI}$ is defined by the following expression:

$$L_{DI} = L_E + L_\phi$$

where $$L_E = 10 \log_{10} \frac{1}{T} \int_0^T 10^{L(t)/10} dt$$

$$L_\phi = K \frac{\tau}{T} \sum_{t=0}^{T} \frac{L_F(t) - \overline{L(t)}}{n}$$

where the first expression $L_E$ indicates the "average energy level" of the noise and $L_\phi$ is the "noise fluctuation level". In both following expressions T is the total measuring time of the acoustical event in seconds; $\overline{L(t)}$ is the instantaneous noise level; K is a constant correlated with the physical data of the noise and subjective tests of evaluation of the nuisance; $\tau$ is the predetermined time interval in seconds for the $L_\phi$ measurement which in the analog apparatus was indicated as "sampling time"; $L_F(t)$ and $L(t)$ are the noise levels relative to a small time constant (noise fluctuation) and a greater time constant (average noise level), respectively; n is a whole number depending upon the minimum dB-range of the noise fluctuation one wants to detect. The nuisance component $L_E$ as determined above is the time calculated average value of the noise intensity expressed in logarithmic scale. The component $L_\phi$ is the nuisance portion due to the noise fluctuations.

According to the present invention the index $L_{DI}$ is obtained by the following suitably modified expressions:

$$L_{DI} = L_E + L_\phi \quad (1)$$

where $$L_E = 10 \log_{10}\left(\frac{1}{T}\int_0^T 10^{L(t)/10} dt\right) \quad (2)$$

$$L_\phi = K\frac{\Delta t}{T}\sum_{i=1}^{N}\frac{f(x_i)}{n} \quad (3)$$

In relation (1) $L_E$ is termed "Average Sound Level" and $L_\phi$ "Noise Fluctuation Level". The index $L_{DI}$ can be expressed in dB(A) if noise levels are A - weighted. In equations (2) and (3), T (in seconds) is the measuring time of the acoustical event, L(t) is the instantaneous sound level, K is a dimensionless constant correlated with subjective tests and provisionally fixed at 3.2, $\Delta t$ (in seconds), termed sampling time in the previous definition of the mentioned papers, is fixed here at 1 and can be considered as a scanning factor, N is the number of sound fluctuations occurring in the time T, and n is a whole number chosen according to the minimum noise fluctuation one wants to detect. The term $f(x_i)$ in the summation represents the sound fluctuation corresponding to the ith value of the time dependent variable x defined by:

$$x(t) = Lp(t) - \overline{L(t)} \quad (4)$$

where $$Lp(t) = 10 \log_{10}\left(\frac{1}{\tau_1}\int_0^{\tau_1} 10^{L(t)/10} dt\right) \quad (5)$$

and $$\overline{Lp(t)} = 10 \log_{10}\left(\frac{1}{\tau_2}\int_0^{\tau_2} 10^{L(t)/10} dt\right) \quad (6)$$

In equation (4) Lp(t) represents the peak sound level relative to a short time constant, $\tau_1$, and $\overline{L(t)}$ is the average level for a relatively longer time constant, $\tau_2$.

Finally, f(x) is a function defined by the following relations:

$$f(x) = 0 \quad \text{for } x \leq 0 \quad (7)$$

$$f(x) = Lp(t) - \overline{L(t)} \quad \text{for } x > 0 \quad (8)$$

The function f(x) represents the substantial change in the index $L_{DI}$ definition from the above mentioned papers as the new formulation accounts only for positive noise fluctuations with respect to the average level $\overline{L(t)}$.

Each sound fluctuation exceeding the average level $\overline{L(t)}$ by $f(x_i)$ decibels is counted as many times as the integer n dB step is exceeded. In this manner the summation in relation (3) accounts for both the magnitude and frequency of occurrence of sound fluctuation.

Thus, noise fluctuation level $L_\phi$ accounts for the behavior of the human ear under certain noise conditions. In fact, the index $L_{DI}$ accounts not only for the instantaneous noise fluctuations but also for the recent history of the noise as the nuisance sensation depends also on the temporary acclimation of the listener to the noise level immediately preceding the noise fluctuation.

The concepts expressed above can be exemplified considering the operation of the measuring apparatus of this invention in the following three limit conditions:

i) steady noise: $L_\phi$ does not give any contribution to the nuisance index which depends only upon the average noise intensity;

ii) quickly increasing noise intensity after a noise standstill: in such a case the differential value $Lp(t) - \overline{L(t)}$ is strongly increased, thus resulting in a high value of $L_\phi$;

iii) quickly decreasing noise from a high value of noise intensity: this situation is similar to case ii) but in the reverse direction. $L_\phi$ does not give any contribution. It is evident from the above that index $L_{DI}$ is a physical parameter approximating as much as possible a psycho-physiological aspect of the nuisance caused by the noise. It is in fact known that a fluctuating noise sensed after a long enough silence interval causes a nuisance sensation greater than that of a noise having fluctuations of the same magnitude and statistical distribution but sensed immediately after a background noise which is so loud as to considerably raise the threshold level of the human ear sensitivity.

Accordingly, it is an object the present invention to provide an improved apparatus and method for measuring noise nuisance.

Another object of the invention is to provide a method and apparatus allowing uninterrupted measurement of the nuisance level for periods extending over thirty minutes.

Yet another object of the invention is to provide an improved apparatus and method for measuring nuisance level $L_{DI}$ using digital values.

A further object of the invention is to provide an apparatus and method which allows the measuring of the index $L_{DI}$ as a physical parameter which approximates a psycho-physiological aspect of the nuisance caused by noise.

Yet another object of the present invention is to provide a method for the measurement of index noise nuisance level which is not effected by the noise fluctuations which are negative relative to the average noise level.

Still another object of the present invention is to provide an apparatus for the measurement of the index of the nuisance level in a quicker more accurate manner.

Still other objects and advantages of the invention will in part be obvious and will in part be apparent from the specification.

The invention accordingly comprises the several steps and relation of one or more of such steps with respect to each of the others, and the apparatus embodying features of construction, combinations or elements and arrangement of parts which are adapted to effect such steps, all is exemplified in the following detailed disclosure, and the scope of the invention will be indicated in the claims.

BRIEF DESCRIPTION OF THE DRAWINGS

For a fuller understanding of the invention, references had to the following description taken in connection with the accompanying drawings, in which:

FIGS. 5 and 6 are flow charts of the second section of the apparatus, the first flow chart showing the steps of noise sample detection, the second flow chart showing the steps of digital signal processing.

DETAILED DESCRIPTION OF THE PREFERRED EMBODIMENTS

Figure 1:
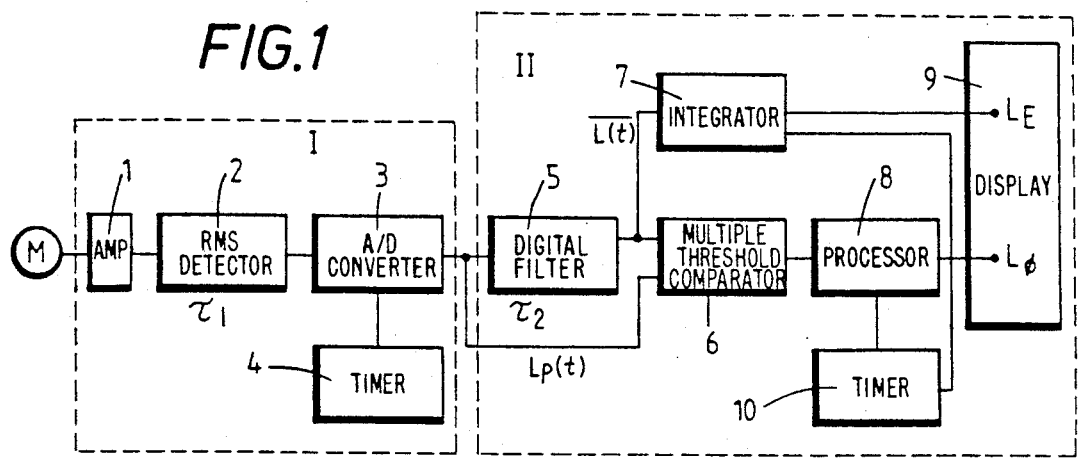
FIG. 1 is a block diagram of the apparatus constructed according to the invention.

Reference is first made to FIG. 1 in which a noise receiving microphone M supplies an electrical signal to a preamplifier 1 feeding in turn its output signal to an RMS-detector 2 provided with a short time constant $\tau_2$. The output signal of detector 1 given by equation (5) drives an 8-bit A/D converter 3 which receives inputs from a timer 4. The output signal of A/D converter 3 is applied both to a digital filter 5, acting as an RC-circuit having a long time constant, $\tau_2$, and to one input of a multiple threshold comparator 6.

The output signal of digital filter 5 given by equation (6) is simultaneously applied to an integrator 7, and to a second input of multiple threshold comparator 6. Integrator 7 makes the integration in time T and supplies the parameter $L_E$ to display 9 and timer 10. Multiple threshold comparator 6 compares the two received signals $L_P(t)$ and $\overline{L(t)}$ outputs signals f(x) in accordance with equation (8) to suitable store registers of processor 8 which is associated with a timer 10. Processor 8 calculates the parameter $L_\phi$ in accordance with equation (3) which is supplied to a display 9, where said parameters can be separately stored in RAM as well as summed to achieve $L_{DI} = L_E + L_\phi$.

In FIG. 1 the operating parts are divided into two basic sections indicated as I and II, respectively, and shown inside dashed lines. Section I is comprised of amplifier 1, RMS detector 2, A/D converter 3 and timer 4 providing a preliminary processing of the analog signal and the required analog-to-digital conversion in order to successively carry out the digital signal processing. Components 5 to 10 of section II perform the digital signal processing and perform the logic functions providing the synthesis of all the data processing as well as the displaying of final results. Accordingly, section II performs as a microprocessor of the digital signal. Briefly section II has been designed as an electronic system provided with a microprocessor card implementing a suitable software to perform the desired logic functions.

The signal from microphone M is properly amplified by amplifier 1 and is fed to RMS-detector 2 provided with a short integration time constant $\tau_1$. The output signal of detector 2 is subjected to analog-to-digital conversion by A/D converter 3. A/D converter 3 also interfaces its output signal with digital filter 5 of section II. The first section is also provided with timer 4 which performs a clock function and synchronizes the sampling circuit and the interface of A/D converter 3.

An exemplary embodiment utilizes technology which allows a portable battery-powered apparatus to be provided due to low power consumption. 8-bit A/D converter 3 is adapted to cover a dynamic of about 46 dB which is considered wide enough because the conversion is carried out after the filtering operation of RMS detector 2 having a time constant 1. Therefore the dynamic of the signal is strongly reduced with respect to the input signal of the microphone. As a further consequence a very low sampling frequency can be used. If, for example, $\tau_1 = 10$ ms, which is an optimum value for measuring the swift noise fluctuations, the sampling frequency can be chosen somewhat higher than 200 Hz, which is the theoretical minimum value provided by the sampling theorem for the above mentioned value of $\tau_1$.

The digital signal is then processed by a digital filter 5 which is able to act as a RC-circuit having a high time constant. The output signal of the digital filter 5 is integrated by means of summing operations in a integrator 7 so as to provide the component $L_E$ of the index $L_{DI}$. Integrator 7 may be a store register. Component $L_E$ is then output to a display unit 9 providing a readout for the operator.

The calculation of the component $L_\phi$ is carried out by means of multiple threshold comparator 6 and processor 8. The multiple threshold comparator 6 compares the two input signals, i.e. the low time constant signal (which is the digital input signal of the digital filter 5) and the high time constant signal (which is the output signal of the digital filter 5). Comparator 6 has four thresholds. The thresholds of comparator 6 are spaced from one another by 3 dB so as to cover a dynamic range of 12 dB. The output signals of comparator 6 (one for each threshold) are fed to as many processors 8 which act as counters or a register. The total sum of the counting operation is then fed, except for a conversion factor to the display unit 9 providing the desired component $L_\phi$. The programmable timer 10 determines the total time interval for the measurement.

Figure 2:
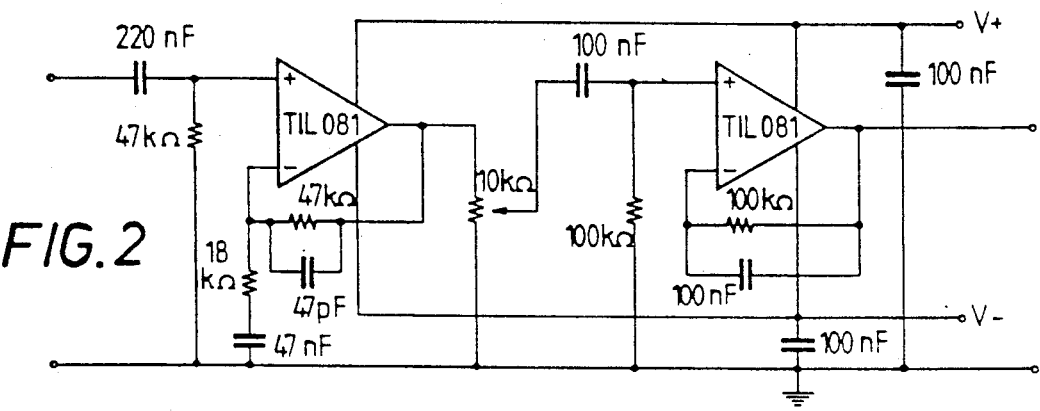
FIG. 2 is a circuit diagram of the input preamplifier.

Reference is now made to FIG. 2 wherein the circuit diagram of the input amplifier 1 is provided. Amplifier 1 is formed of two operational amplifiers using input JFET TIL 081. The first amplifier is connected so as to have a voltage gain of about 10 dB and an input impedance of 47 kOhm.

The second operational amplifier, which is connected to the first stage over a trimming resistance to adjust the gain calibrating the apparatus, is used as an impedance matching unit to provide a suitable coupling with RMS-detector 2 which requires as a drive stage a low inner impedance generator. The gain of the amplifier needs a pre-amplified microphone M adapted to provide output voltages of about 1 $V_{eff}$. A sound level meter can be used as pre-amplified microphone M by picking up the signal from its standard "AC" output.

Figure 3:
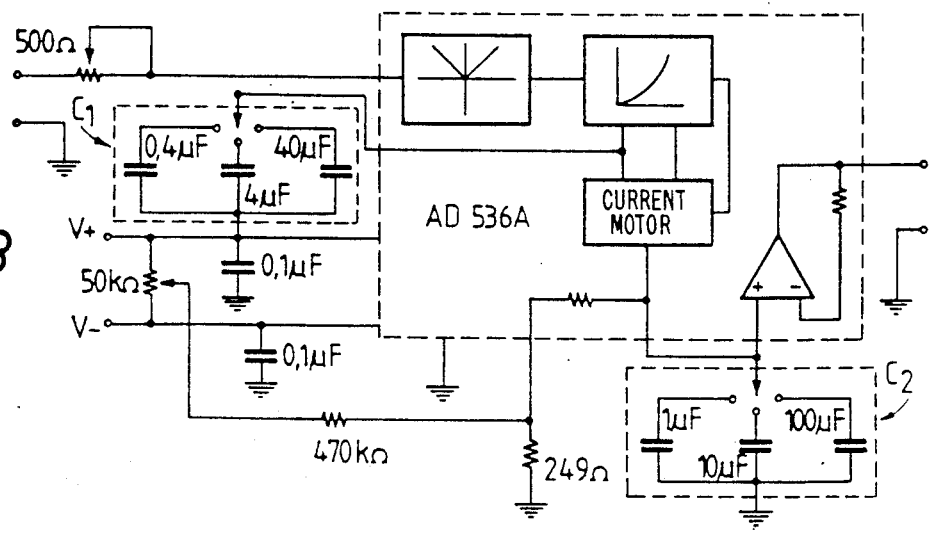
FIG. 3 is a block diagram of the detector.

The circuit diagram of the root mean square ("RMS") detector 2 is shown in FIG. 3. This function is performed by only one integrated circuit AD536A which is adapted to assure its operation for a useful input dynamic range of 60 dB with a precision better than one percent over 40 dB for signals having a crest factor up to 7.

In order to minimize the output voltage offset, a trimmer is provided which is formed of potentiometer of 50 kOhm and a voltage divider consisting of two resistors of 470 kOhm and 249 kOhm, respectively. A further input trimming resistance allows a precise adjustment of the scale factor which can be effected by the offset compensation network.

The capacitor set $C_1$ consists of three components with values of 0.4 $\mu$F, 4 $\mu$F and 40 $\mu$F corresponding to 10 ms, 100 ms and 1 s, respectively. Thus, the circuit can be preset according to the time constants to measure fast, middle or slow noise fluctuations, respectively. This makes the apparatus of this invention particularly versatile as it accounts for noise measurement in a wide range of noise pollution situations. The capacitor set $C_2$ also consisting of three components with values of 1 $\mu$F, 10 $\mu$F and 100 $\mu$F, respectively, allows the residual ripple to be reduced without impairing the settling time of RMS-detector 2. The value of $C_2$ is selected according to that of $C_1$ so that $C_2$ is equal to about $2C_1$.

Figure 4:
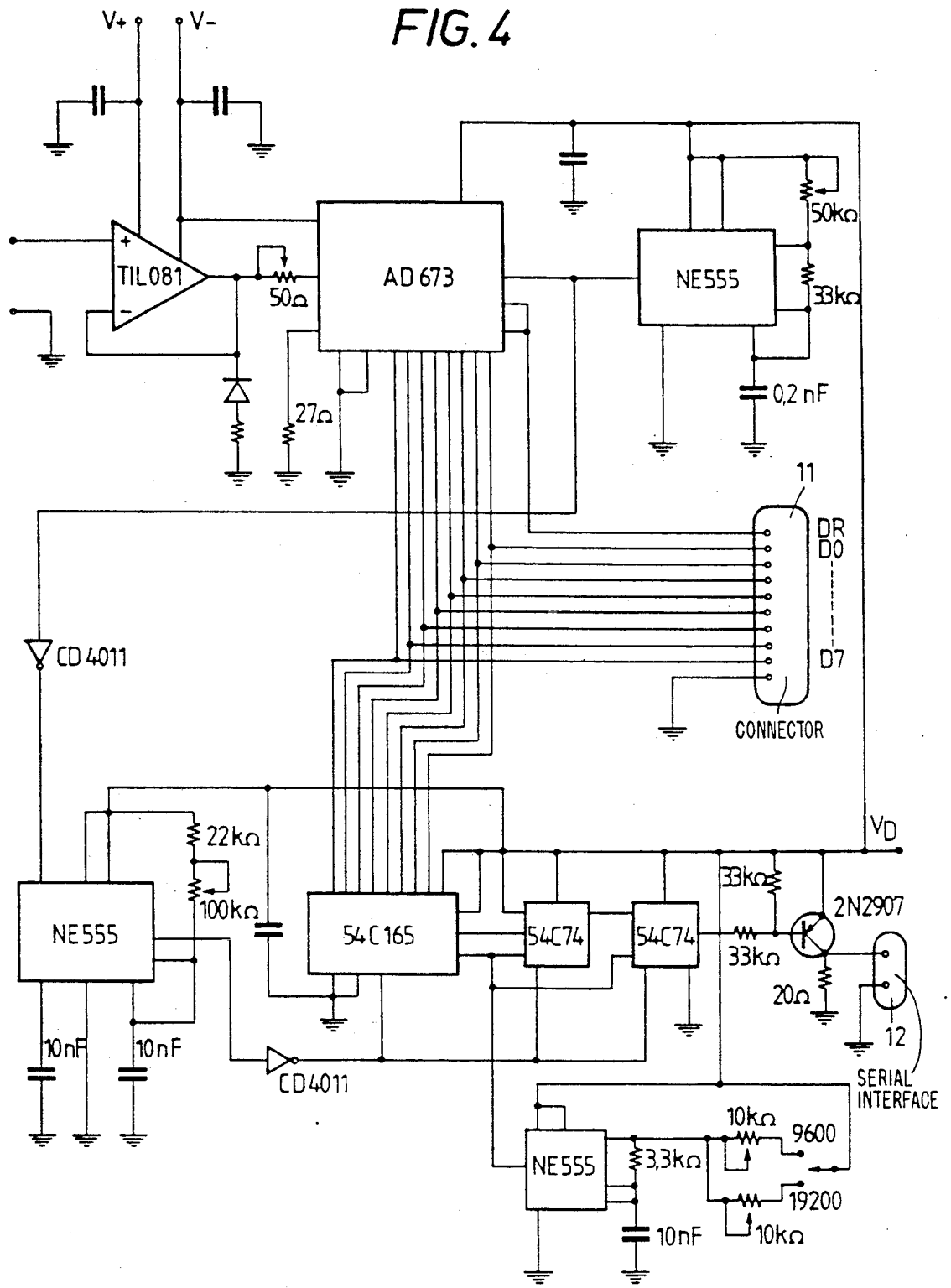
FIG. 4 is a circuit diagram of the analog/digital converter and the associated circuits.

The output signal of the RMS-detector 2 is successively converted into digital form by the 8-bit A/D converter 3. As seen in FIG. 4, A/D converter 3 consists of only one integrated circuit AD 673 performing the basic functions of a device constructed in accordance with the successive approximation technique: a comparator, a A/D converter and a shift register (SAR). As the input of A/D converter 3 has a low impedance, an input matching unit formed of an operational amplifier TIL 081 is provided. It is also provided with a full scale calibration by a trimming resistance of 50 Ohm.

A/D converter 3, even if utilizing only 8 bits, has a sufficient input dynamic (about 46 dB) as its input signal is fed from a low-pass filter of RMS-detector 2. As the cutout frequency relative to such a filtering operation is 100 Hz, the minimum theoretical sampling frequency is 200 Hz, such a value being increased to 250 Hz for safety reasons.

In an exemplary embodiment, the conversion time of the device, according to the manufacturer's specification, is lower than or equal to 30 μs. As the conversion rate with respect to the low passing band of the analog signal is high, a sample and hold circuit is no longer needed, thus simplifying the whole system. A/D converter 3 provides only one pulse control signal which establishes the beginning of each A/D conversion operation. The sampling frequency of the control pulse generated by the integrated circuit NE 555.

The digital signal is available directly in 8-bit parallel form at the output of the converter which is provided with an inside buffer and does not require any additional circuit for interfacing with the outside. The parallel output is then simply connected to an output connector 11 along with a ninth bit. Connector 11 is inserted into converter AD673 and signals the end of conversion, i.e. "output data ready".

The parallel interface allows the outer microprocessor to be directly connected provided that the microprocessor is provided in turn with a parallel interface. Moreover, in order to allow microprocessors provided with serial interface 12 to be connected, there is also provided a parallel/serial protocol converter compatible with the standard interface RS 232. The circuit is simply comprised of a shift register 54C 165 and two flip-flops of D-type driven by suitable strobe signals and clock signals generated by auxiliary circuits formed of two additional integrated circuit NE 555. A transistor 2N 2907 makes the logical voltage level compatible with those of the standard interface RS 232.

The use of a serial interface 12 is possible as the provided sampling frequency is low (250 Hz), thus allowing data transfer in real time over this connection. However as it is convenient to use the maximum data transfer rate, the serial interface operates with at least 9600 baud, preferably it is provided with a higher rate of 19,200 baud to be used if the employed microprocessor can operate accordingly. The parallel interfacing, however, is the only one that allows the greatest number of operations in real time to be carried out by the microprocessor between samplings in succession. If the developed software provides operations of this type the use of a parallel interface becomes compulsory.

The auxiliary circuits for the generation of the sampling frequency, the clock signal for the serial interface and the strobe signal provided by a monostable multivibrator from the sampling frequency are formed of simple oscillators which are not crystal-controlled as the required precision and stability are not so high (about 1%). A final auxiliary circuit is the power supply. The voltages required by the above described circuits are 5 volts and ±15 volts. In order to use cell batteries each having the same nominal voltage, a simple serial regulation circuit has been used to obtain 5 volts directly from the 9 volt battery. Moreover a DC-DC converter has been used supplying the voltage ±15 volts with a maximum load current of 20 mA from the 9 volt battery.

The function of the software required to implement the functions described in section II of the block diagram of FIG. 1 is provided in flow charts as seen in FIGS. 5, 6 rather than a language listing for a determined microprocessor system, this provides the general criteria to properly develop a software apart from the employed system. This further allows the increasing of the available memory as well as of the data processing rate of the central processing unit to be utilized, the capabilities being the main features which are more and more improved with the increase of the efficiency of the portable microprocessor systems. This is true in particular for the portable systems which still need considerable improvement with respect to the stationary systems, especially in terms of cost to efficiency ratio.

A first function of the microprocessor system relates to the acquisition of digital data from A/D converter 3. Such data is stored in the RAM of the microprocessor and this can be processed in accordance with two different strategies. First, if the microprocessor is fast enough to carry out the subsequent filtering and comparing operations in real time, i.e. in the time interval between two successive samplings, a small buffer in the RAM will be sufficient to store the incoming sample. However, if the microprocessor does not allow data to be processed in real time, then in a second strategy it is first necessary to store the samples of the current measurement in a RAM and to perform the digital data processing at the end of the acquisition process.

In the first case there is no limit to the maximum measurement time apart from that recommended by the practice. In the second case the maximum interval which can be provided for the measuring time generally depends upon the available RAM. As the samples are obtained at a generally low frequency, even if only 32 kbytes of RAM are available, the maximum interval for the measurement of the index $L_{DI}$, for example in case of time constant $\tau_1 = 10$ ms, is equal to $32,000/250 = 131$ seconds, i.e. on greater than an equivalent analog apparatus. The measurement time interval is in any case determined by a timer which can be formed by the system clock suitably programmed by the control software. The clock generates interrupt signals which cause the central processing (section II) unit to stop the acquisition process. The "data ready" signal for the CPU to be received from A/D converter 3 can be generated either by polling techniques or by interrupt techniques, the latter being almost compulsory in case of data processing in real time. As a result the operations of the flow chart of FIG. 5 should be carried out.

The subsequent data processing consists of the digital filtering to obtain an integrated signal according to the longer time constant, comparing the levels having a short time constant with the level having the long time constant and calculating $L_E$ and $L_\phi$ by using suitable counting registers. The final value of $L_E$ and $L_\phi$ is then fed to display 9 of the employed microprocessor.

The flow chart of FIG. 6 shows the logic sequence to be performed in order to carry out the above described operations. It should be noted that in the first time period of two seconds corresponding to the first 500 samples an initial value of the level relative to the long time constant is calculated without any calculation relative to $L_E$ and $L_\phi$.

Referring now to the flow chart of FIG. 5 blocks 13 to 20 relative to the steps of said flow chart are illustrated. In a step 13 operation is started. In step 14 the pointer register is initialized to RAM sample storage. In step 15 the total measuring time in seconds is set by presetting timer 10. In step 16 the count-down of timer 10 is begun. At the end of the time interval set in step 15 an interrupt signal is generated which leads to the end of processing in step 20. Before this event occurs, the program goes to the acquisition logic loop of steps 17, 18 and 19. In step 17 it is determined whether the signal is being output by A/D converter 3. If the condition is not true the process is repeated. If the "data ready" signal is output then the data output by A/D converter 3 is shifted to the RAM location pointed by the already preset register of processor 8 in a step 18. In step 19 the pointer registers are increased in such a way as to indicate the free location of the RAM for the next sample. The program then comes back to step 17 to process the next sampling. Once timer 10 finishes counting it is the end of the sample acquisition process in step 20.

Reference is now made to the flow chart of FIG. 6, in which blocks 21 through 40 indicate the processing of the acquired digitized signal. The start of digital sample processing is conducted in a step 21. In step 22 variable and process pointer initialization occurs. $L_\phi$ is set to 0. This variable $L_\phi$ will assume the final value of $L_\phi$ at the end of the process. A variable $L_E$ is also set to 0. This variable will assume the final value of $L_E$ at the end of the process. A RAM data pointer, POINT, indicates the start of the first digital sample. The time interval between two consecutive samples IRC is set to 1/fc = 1/250 (equal to the inverse of the sampling frequency 250 Hz), while, SCAL=IRC; the scale factor, SCAL is set to IRC, the process variable, CMP, number of sample to be processed, NC, process variable, TAU, process variable and, sum are all set to 0. The digital filter constant, AK is set to EXP (−IRC). The digital filter constant, AH is set to AK. The total number of samples, NCP, is calculated by the time period in seconds multiplied by 250. Lastly the constants for the multiple threshold comparator 3 are set at A=0,707; B=A*A; C=A*B; D=A*C. In step 23 the counter is preset to 500 samples (2 seconds for a sampling frequency of 250 Hz) NC=500;

In step 24 digital filter 5 calculates L(t) for the first 500 samples,

CMP becomes the value pointed by POINT,
SUM=AH*CMP+AK*TAU;
TAU=SUM;
POINT=POINT+1 and
NC=NC−1.

In step 25 it is determined whether NC=0. If the condition is true, the process goes forward to step 26, otherwise it returns to step 24. In step 26 NC=NCP−500 the counter is preset to the total sample number still to be considered; NC equals NCP−500. In step 27 digital filter 5 calculates for NC samples;

CMP becomes the value pointed by POINT,
SUM=AH*CMP+AK*TAU,
TAU=SUM,
POINT=POINT+1 and
NC=NC−1. 1.

In steps 28, 29, 30, 31, 32, 33, 34, 35 multiple threshold comparator 6, (4 thresholds with 3 dB spacing from one another), compares TAU with four values A*CMP, B*CMP, C*CMP and D*CMP corresponding to the four levels of multiple threshold comparator 3 spaced from one another by 3 dB (due to the weighing coefficients A, B, C and D). The steps 28, 30, 32 and 34 perform a test of the conditions A*CMP>TAU, B*CMP>TAU, C*CMP>TAU, D*CMP>TAU. If each threshold is exceeded, the variable $L_\phi$ is increased (in 29, 31, 33 or 35). In step 36 the variable $L_E$ is increased by the value of the considered sample; $L_E = L_E + CMP$.

In step 37 it is determined whether NC=0. If the condition is true, the process continues to step 38, otherwise the loop is repeated for the following sample returning to step 27. In step 38 the final values $L_E$ and $L_\phi$ are calculated. The value accumulated in the variable $L_E$ is divided by the sample number (average value). The value accumulated in the variable $L_\phi$ is divided by the scale factor SCAL so that:

$$L_E = L_E/(NCP-500)$$

$$L_\phi = L_\phi/SCAL$$

In step 39 the final values of $L_E$ and $L_\phi$ are shown on the display 9 of the microprocessor system (section II). The data processing is ended in step 40.

It will thus be seen that the objects set forth above, among those made apparent from the preceding description, are efficiently attained and, since certain changes may be made in carrying out the above method and in the construction set forth without departing from the spirit and scope of the invention is intended that all matter contained in the above description and shown in the accompanying drawings shall be interpreted as illustrated and not in a limiting sense.

It is also to be understood that the following claims are intended to cover all of the generic and specific features of the invention herein described and all statements of the scope of the invention in which, as a matter of language might be said to fall therebetween.

We claim:

1. Apparatus for the measurement of an evaluation index of the nuisance index ($L_{DI}$) level of an acoustic noise, said index being the sum of a first parameter, $L_E$, indicating the average acoustic energy level of the noise during a predetermined measuring time period and a second parameter, $L_\phi$, indicating the fluctuation level of the noise during the measuring time period, comprising a microphone (M) for converting the acoustic noise to an electric signal, the electric signal being generated as a function of the acoustic intensity of the noise; supplying the signal to a RMS-detector means (2) having a time constant, $\tau_1$, and $\tau_1$ being a time interval short enough to allow the RMS detector means to output a first signal, $L_P(t)$, in response to the electric signal, such that the first signal represents the instantaneous value of the noise intensity; analog-to-digital converter (3) associated with a timer (4) for converting the first signal to a data signal including a plurality of digital data samples in a predetermined sampling time period; digital filter means for receiving the data signal and calculating the average value $\overline{L(t)}$ of the data signal and having a second time interval, $\tau_2$ which is longer than the first time interval of the RMS detector means, but shorter than the measuring time interval; adding means (7) for receiving the average values and summing the average values $\overline{L(t)}$ during the measuring time interval; and comparator and processing means (6) for receiving the data signal and the calculated average values and comparing the data signal with the calculated average value during a plurality of predetermined comparison time intervals, each comparison time interval being shorter than the measuring time interval, then calculating the difference between the sampled data output by the analog to digital converter and the calculated average values, dividing the differences by a predetermined coefficient, n, representing the minimum detectable noise fluctuation and summing up only those of the divided differences which are positive in value; and a display module coupled to the adding means (7) and processing means (6) for displaying the summed average values ($L_E$) and the summed differences ($L_\phi$), said RMS-detector means including an integrated circuit AD 536, a comparator formed of a potentiometer coupled to said integrated circuit, a divider formed of at least one resistor and an input trimming resistor, a first variable capacitor means ($C_1$) for setting short time constants and a second capacitor means ($C_2$) for matching the capacitance value preset in the first capacitor means ($C_1$).

* * * * *